(12) United States Patent
Hiraguchi

(10) Patent No.: US 6,908,056 B2
(45) Date of Patent: Jun. 21, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/649,673

(22) Filed: Aug. 28, 2003

(65) Prior Publication Data

US 2004/0046076 A1 Mar. 11, 2004

(30) Foreign Application Priority Data

Aug. 30, 2002 (JP) .................................... 2002-255105

(51) Int. Cl.[7] .......................................... G11B 23/107
(52) U.S. Cl. .................................... 242/348; 360/132
(58) Field of Search .................... 242/332.4, 532.1, 242/582, 347, 347.1, 348, 348.2, 347.2; 360/132

(56) References Cited

U.S. PATENT DOCUMENTS

| | | | | |
|---|---|---|---|---|
| 3,861,611 A | * | 1/1975 | Esashi et al. ............... 242/347 |
| 4,045,821 A | * | 8/1977 | Fujikura ...................... 360/132 |
| 4,559,575 A | * | 12/1985 | Noto et al. .................. 360/132 |
| 5,868,333 A | * | 2/1999 | Nayak ...................... 242/348.2 |
| 6,330,983 B1 | * | 12/2001 | Augustin ................. 242/332.4 |
| 6,349,892 B2 | | 2/2002 | Morita et al. |
| 6,702,216 B2 | * | 3/2004 | Shima et al. ............ 242/348.2 |
| 6,702,217 B2 | * | 3/2004 | Hiraguchi ................ 242/348.2 |
| 6,752,341 B2 | * | 6/2004 | Morita et al. ............... 242/348 |

* cited by examiner

Primary Examiner—William A. Rivera
(74) Attorney, Agent, or Firm—Sughrue Mion, PLLC

(57) ABSTRACT

A recording tape cartridge has a substantially rectangular case. An upper case and a lower case are joined together by peripheral walls thereof abutting each other. A reel, on which a recording tape T is wound, is rotatably accommodated in the case. An opening for pulling-out of an end portion of the recording tape T is formed in the case. A shielding member, which opens and closes the opening, is held slidably in the case. A projection (operation portion), which engages with an engaging mechanism of a drive device, is formed at the shielding member. A slit is formed in a peripheral wall such that the projection is slid in a state of being exposed. A distal end surface of the projection exposed from the slit is formed so as to be substantially flush with the peripheral wall when the shielding member closes the opening.

18 Claims, 11 Drawing Sheets

RECORDING TAPE CARTRIDGE

CROSS-REFERENCE TO RELATED APPLICATION

This application claims priority under 35 USC 119 from Japanese Patent Application No. 2002-255105, the disclosure of which is incorporated by reference herein.

BACKGROUND OF THE INVENTION

1. Field of the Invention

The present invention relates to a recording tape cartridge accommodating, within a case, a single reel on which is wound a recording tape, such as a magnetic tape or the like, which is used as a recording/playback medium mainly of computers or the like.

2. Description of the Related Art

Conventionally, magnetic tape cartridges have been known in which a magnetic tape, which is used as a data recording/playback medium of a computer or the like, is wound on a single reel, and the reel is accommodated in a case. A leader member, such as a leader pin, a leader tape, or a leader block, is provided at the distal end of the magnetic tape. A pull-out mechanism provided at a drive device pulls the leader member out from an opening of the magnetic tape cartridge, and winds the magnetic tape, which is fixed to the leader member, onto a take-up reel of the drive device.

A reel gear is formed in an annular form in the center of the bottom surface of a reel which emerges from an open hole formed in the bottom surface of the magnetic tape cartridge. Due to a driving gear, which is provided at a rotating shaft of the drive device, meshing with this reel gear, the reel is driven to rotate. By rotating the reel of the magnetic tape cartridge and the take-up reel of the drive device synchronously, data can be recorded onto the magnetic tape, and data recorded on the magnetic tape can be played back.

Such a magnetic tape cartridge requires little space for storage thereof, and a large amount of information can be recorded thereon. As shown in FIGS. 9 through 11, the position of the opening and the type of the door which opens and closes the opening differ for each type of leader member. Namely, in the case of a leader pin 60, as shown in FIG. 9, an opening 68 is formed in a side wall 64 of a case 62 which side wall 64 is parallel to the direction of loading the magnetic tape cartridge into a drive device (the direction of arrow P). The opening 68 is opened and closed by a door 66 which slides in the same direction as the loading direction.

However, when the opening 68 is provided at the side wall 64 of the case 62 in this way, the pull-out mechanism of the drive device must pull-out the leader pin 60 by circling around from the left-right lateral direction of the case 62. Thus, space for the pull-out mechanism to circle around must be ensured at the drive device, the mechanism for making the pull-out mechanism circle around is complex, and a drawback arises in that the drive device becomes large. Further, there is also the problem that the pull-out path of a magnetic tape T becomes long.

Moreover, in the case of a leader tape 70, as shown in FIG. 10, an opening 78 is formed in a front wall 74 of a case 72 which front wall 74 is perpendicular to the direction of loading the magnetic tape cartridge into a drive device (the direction of arrow P). A door 76 which opens and closes the opening 78 is a rotatable-type door which rotates forward around a supporting shaft 75 supported in a vicinity of a corner portion of the case 72. However, when the opening 78 is provided at the front wall 74 of the case 72 in this way, although there is no need for the pull-out mechanism of the drive device to circle around, the door 76 opens widely toward the front. Therefore, space must be ensured at the drive device so that nothing interferes with the door 76 at the time when the door 76 opens the opening 78, and a drawback arises in that the drive device becomes large.

Moreover, in the case of a leader block 80, as shown in FIG. 11, an opening 88 is formed by diagonally cutting off a corner portion 84 at a front side in the direction of loading the magnetic tape cartridge into a drive device. The opening 88 is directly opened and closed by the leader block 80. However, when the leader block 80 opens and closes the opening 88 in this way, there is the problem that it is easy for the leader block 80 to become dirtied or scratched. Namely, the leader block 80 fits into a reel hub 86 of the drive device, and forms a portion of the reel hub 86. Therefore, there is the concern that, even if the leader block 80 is dirtied or scratched to the extent that does not cause problems when the leader block 80 is normally used as the door, it may become difficult for the leader block 80 to fit together with the reel hub 86, and problems in the conveying of the magnetic tape T may arise.

In addition, the leader block 80 is merely anchored at the edge portion of the opening 88. Thus, when the magnetic tape cartridge is dropped, there is the problem that the leader block 80 can easily come out from the magnetic tape cartridge. Further, because the leader block 80 is larger than the leader pin 60, there is the problem that there are more constraints on the configuration of the case. Thus, a leader pin 60, whose function is separate from that of a door, is superior to the leader block 80 which functions as a door as well.

SUMMARY OF THE INVENTION

Thus, an object of the present invention is to provide a recording tape cartridge in which a door, which opens and closes an opening, and a leader member for pulling-out of a recording tape are separate members, and which has an opening which enables a pull-out path of the recording tape to be the shortest, and has a sliding-type door which can open and close the opening in a small space, and which makes it possible to make drive devices more compact.

In order to achieve the above-described object, one aspect of the present invention is a recording tape cartridge which is loaded into a drive device for use, the recording tape cartridge comprising: a case for rotatably accommodating, at an interior of the case, a reel on which a recording tape is wound, the case having an opening for pulling-out of the recording tape from the interior of the case; and a shielding member, slidably held at the case, for closing the opening, wherein the case has a peripheral wall having an outer surface, and a projection is provided at the shielding member with the projection being exposed from the outer surface of the peripheral wall, such that, due to the cartridge moving in a predetermined direction for loading the cartridge into a drive device, the projection abuts one portion of the drive device and can be moved relative to the peripheral wall, whereby the shielding member opens the opening, and wherein the projection has an end surface which, in a state in which the shielding member closes the opening, is flush with at least one portion of the outer surface of the peripheral wall.

Another aspect of the present invention is a recording tape cartridge which is loaded into a drive device for use, the recording tape cartridge comprising: a case for rotatably accommodating, at an interior of the case, a reel on which a recording tape is wound, the case having an opening for pulling-out of the recording tape from the interior of the case; and a shielding member, slidably held at the case, for closing the opening, wherein the case has a peripheral wall having an outer surface, and a projection is provided at the shielding member with the projection being exposed from the outer surface of the peripheral wall, such that, due to the cartridge moving in a predetermined direction for loading the cartridge into a drive device, the projection abuts one portion of the drive device and can be moved relative to the peripheral wall, whereby the shielding member opens the opening, and wherein the projection, in a state in which the shielding member closes the opening, is within a region of a contour of the case, which region is demarcated by the outer surface of the peripheral wall.

The projection may have an end surface which runs along the predetermined direction for loading, and the end surface may have a portion which is flush with at least one portion of the outer surface of the peripheral wall at a periphery of the projection, i.e., a periphery of a region where the projection is exposed.

Yet another aspect of the present invention is a recording tape cartridge comprising: a case which is substantially rectangular, and at which an upper case and a lower case are joined together by peripheral walls of the upper case and the lower case abutting one another, and which rotatably accommodates a single reel on which a recording tape is wound; an opening formed at the case, for pulling-out of a leader member attached to an end portion of the recording tape; a shielding member which slides so as to open and close the opening; an operation portion projecting at the shielding member, and engaging with an engagement member of a drive device; and a slit formed by cutting out a peripheral wall of the case, for exposing the operation portion, wherein a distal end surface of the operation portion exposed from the slit is formed so as to be substantially flush with the peripheral wall when the shielding member closes the opening.

When the distal end surface of the projection (operation portion) of the shielding member which is exposed from the slit which is formed by cutting out the peripheral wall of the case, is formed so as to be substantially flush with the peripheral wall when the opening is closed, there are no members at the recording tape cartridge which project outward when the recording tape cartridge is not in use (such as when the recording tape cartridge is being stored or the like). Accordingly, an insertion opening, a bucket and the like at a drive device in which the recording tape cartridge is loaded in this state, can be made to have a compact design. Moreover, when the recording tape cartridge is not being used (is being stored), trouble, such as a finger or the like accidentally contacting the operation portion such that the opening is opened, or the like does not arise.

The distal end surface of the operation portion exposed from the slit may be inclined along the draft of the peripheral wall.

Forming the distal end surface of the operation portion of the shielding member, which is exposed from the slit which is formed by cutting out the peripheral wall of the case, so as to be inclined along the draft of the peripheral wall when the opening is closed, is preferable in terms of the external appearance. Further, when the recording tape cartridge is not being used (such as is being stored or the like), there are no members at the recording tape cartridge which project outwardly. Accordingly, an insertion opening, a bucket and the like at a drive device in which the recording tape cartridge is loaded in this state, can be made to have a compact design. Moreover, when the recording tape cartridge is not being used (is being stored), trouble, such as a finger or the like accidentally contacting the operation portion such that the opening is opened, or the like does not arise.

The opening may be formed by cutting a corner portion of the case at the side of loading the case into a drive device.

When the opening is formed in this way by cutting a corner portion of the case at the side of loading the case into a drive device, the plane of opening of the opening can be made to face in the direction of loading the recording tape cartridge into a drive device. Thus, the pull-out mechanism of the drive device can enter in from the front side, and the path along which the recording tape is pulled out can be made to be the shortest. Accordingly, there is no need at the drive device for a complex mechanism which makes the recording tape circle around, and it is possible to design a drive device which is compact and has a low manufacturing cost. Moreover, due to the recording tape traveling along the shortest path, wear of the recording tape caused by contact with a tape guide can be reduced.

DETAILED DESCRIPTION OF THE INVENTION

Hereinafter, a recording tape cartridge 10 relating to an embodiment of the present invention will be described on the basis of FIGS. 1 through 8. First, the overall structure of the recording tape cartridge 10 will be briefly described, and then, main portions relating to the present invention will be described in detail. Note that, for convenience of explanation, the direction of loading the recording tape cartridge 10 into a drive device is denoted by arrow A, and this direction of arrow A is the forward direction (front side) of the recording tape cartridge 10. The direction of arrow B, which is orthogonal to the direction of arrow A, is the rightward direction.

Figure 1:
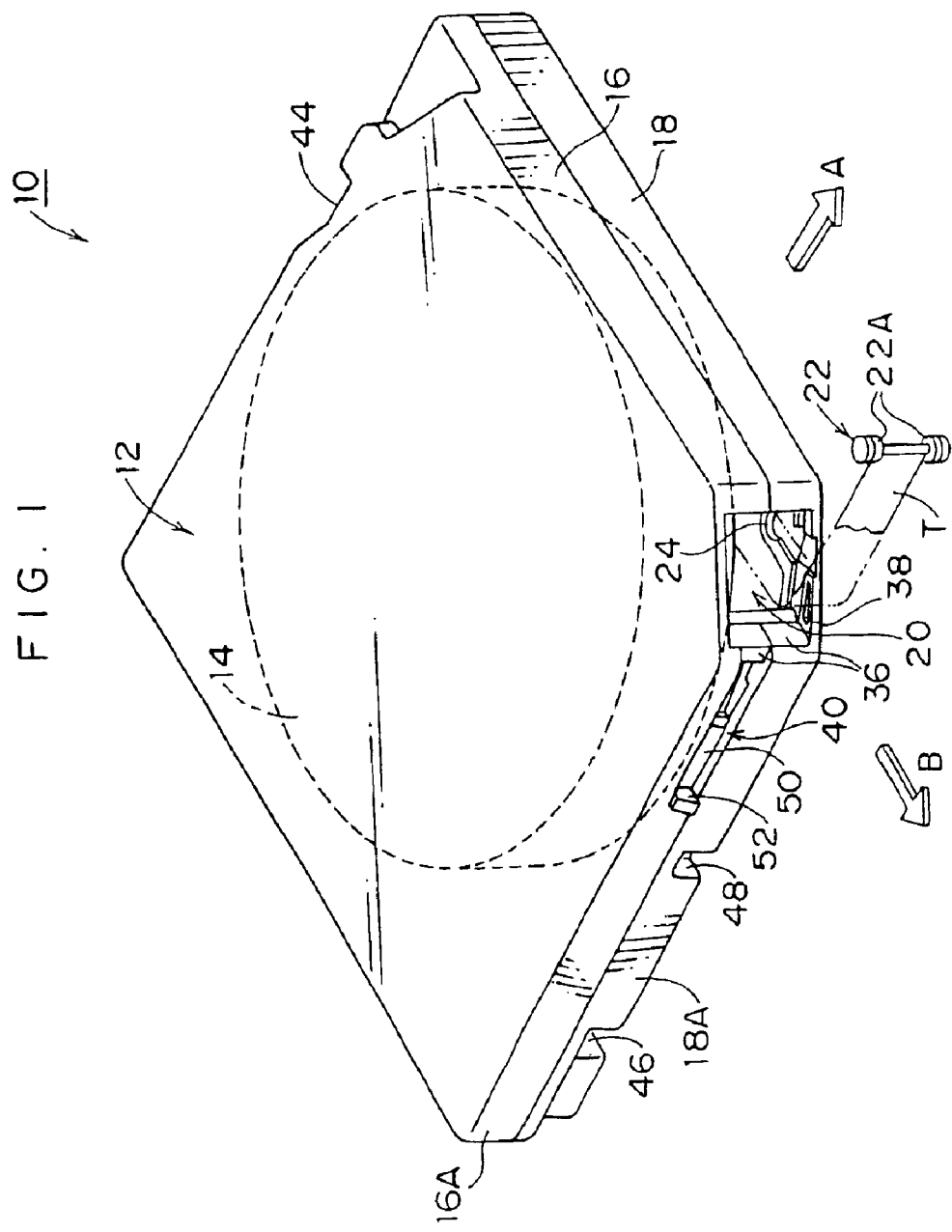
FIG. 1 is a schematic perspective view of a recording tape cartridge relating to an embodiment of the present invention.
Figure 2:
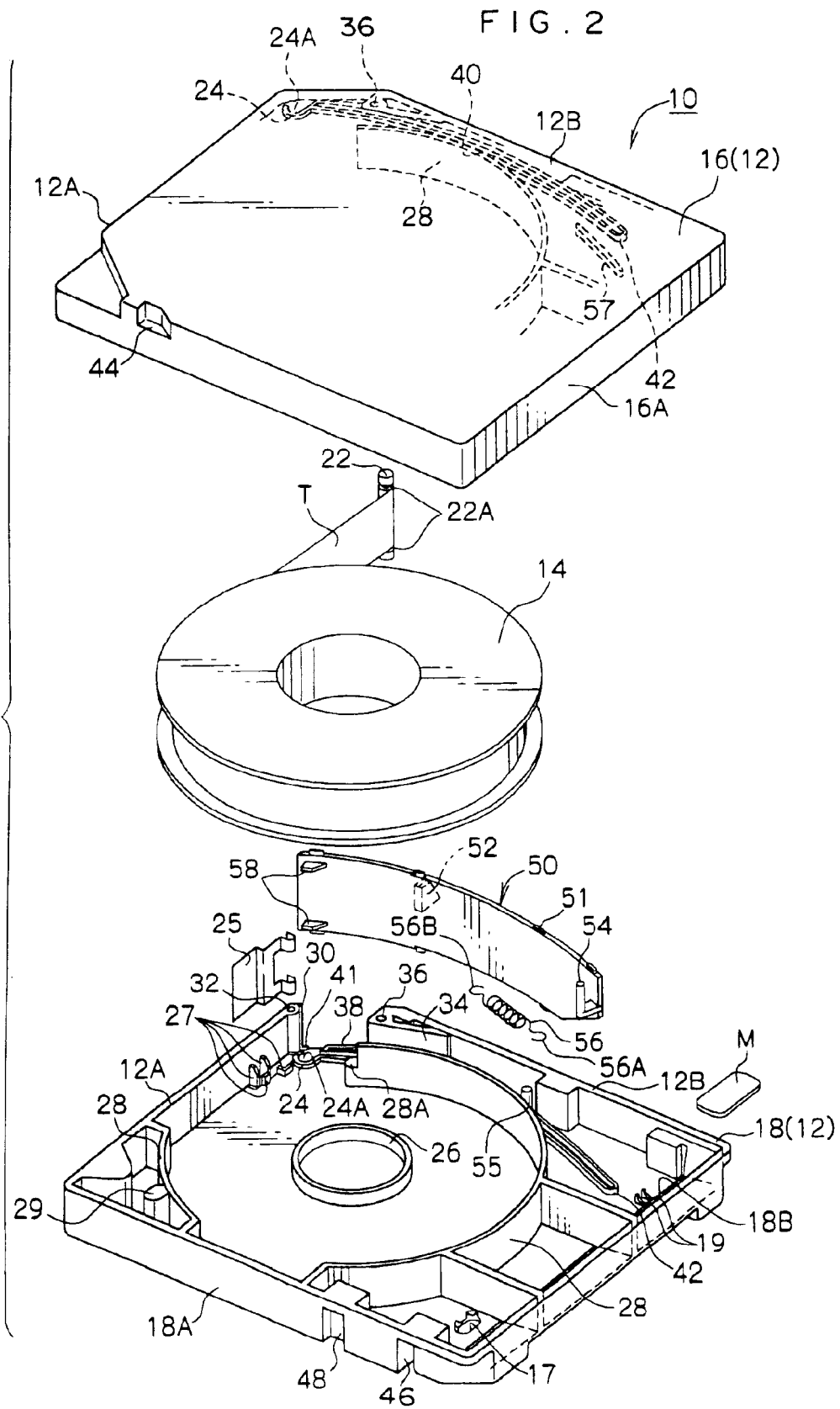
FIG. 2 is a schematic exploded perspective view of the recording tape cartridge relating to the embodiment of the present invention.

As shown in FIGS. 1 and 2, the recording tape cartridge 10 is structured such that a single reel 14, on which is wound a magnetic tape T serving as a recording tape which is an information recording/playback medium, is rotatably accommodated within a case 12 which is formed of a synthetic resin and which is substantially rectangular as seen in plan view. The case 12 is formed by joining together an upper case 16 and a lower case 18 with peripheral walls 16A, 18A thereof opposing each other. The front right corner portion of each of the upper case 16 and the lower case 18, which is one corner portion at the leading side in the direction of loading the recording tape cartridge 10 into a drive device, is cut off at an incline as seen in plan view. A space for accommodating the reel 14, on which the magnetic tape T is wound, is provided at the interior of the case 12.

Further, the corner portion of the upper case 16 and the lower case 18, at which corner portion the peripheral walls 16A, 18A have been cut off, forms an opening 20 which is for pulling-out of the magnetic tape T. A leader pin 22, which is pulled-out while being anchored (engaged) by a pull-out mechanism of a drive device, is connected to the free end of the magnetic tape T which is pulled out from the opening 20. An annular groove 22A is formed in each of the end portions of the leader pin 22 which project out further than the transverse direction end portions of the magnetic tape T. The annular grooves 22A are anchored by hooks or the like of the pull-out mechanism. In this way, the hooks or the like do not contact and scratch the magnetic tape T at the time of pulling-out the magnetic tape T.

Figure 3:
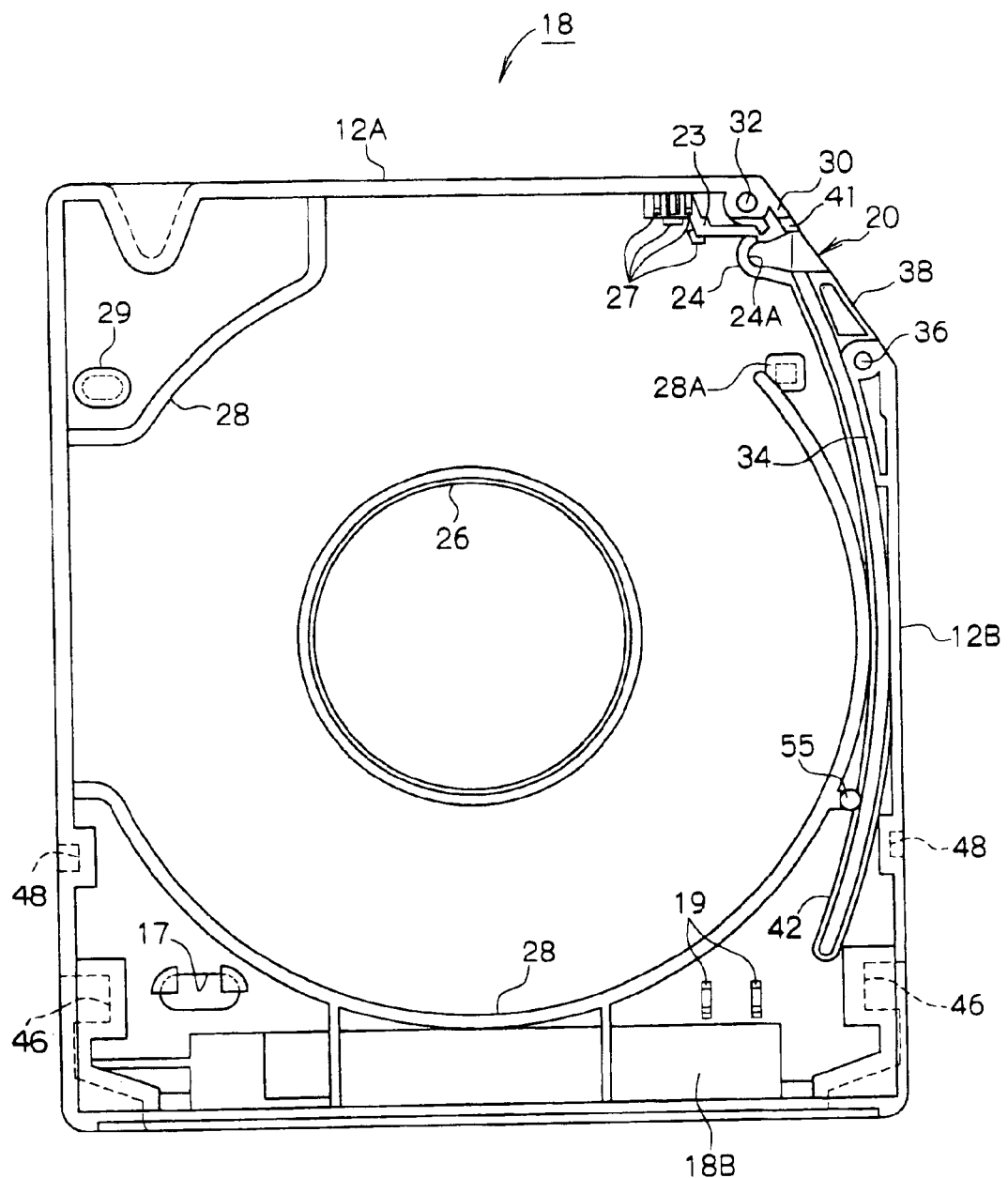
FIG. 3 is a schematic plan view of a lower case relating to the embodiment of the present invention.
Figure 4:
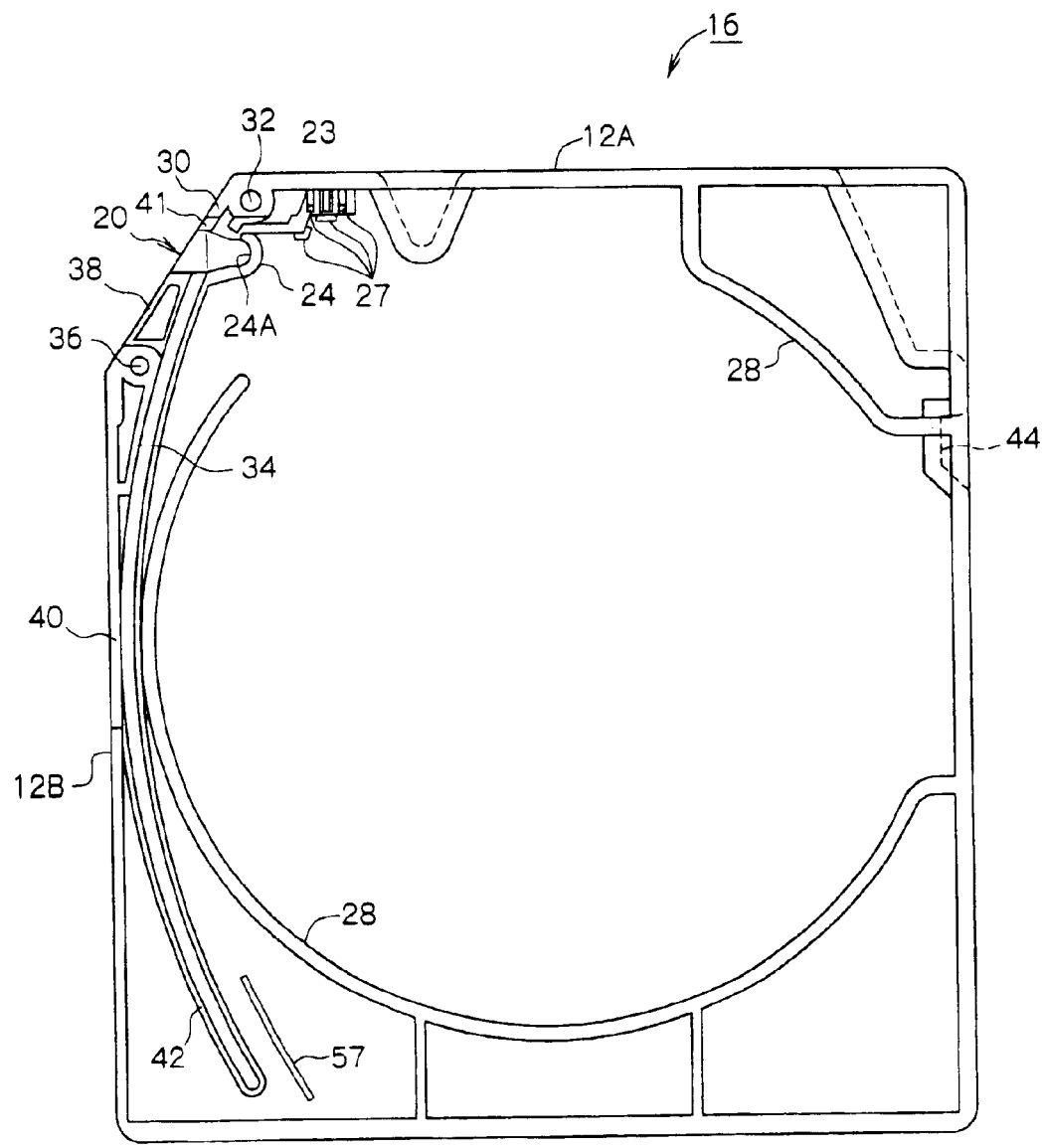
FIG. 4 is a schematic plan view of an upper case relating to the embodiment of the present invention.
Figure 5:
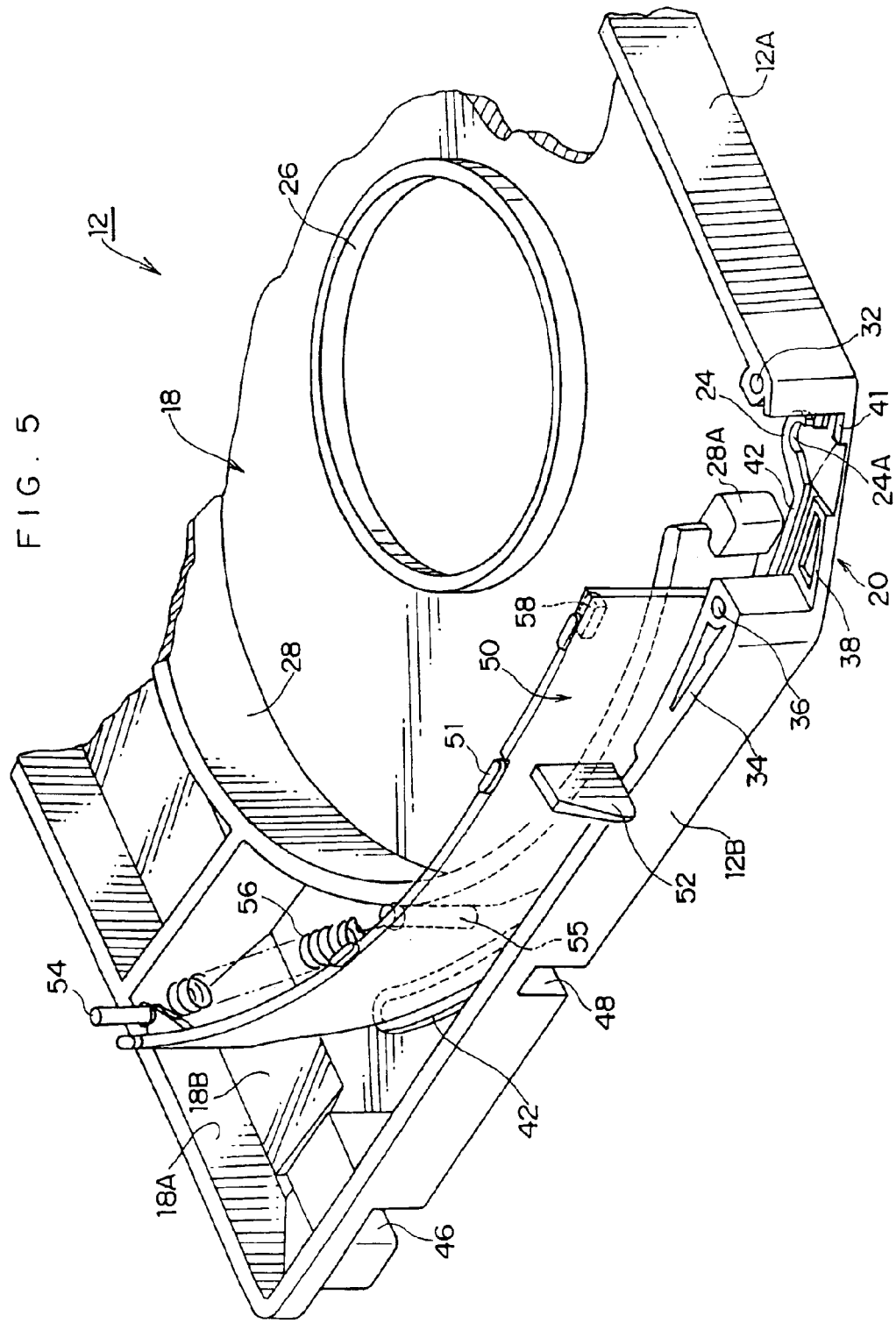
FIG. 5 is a schematic perspective view, as seen from above, showing a state in which a door relating to the embodiment of the present invention opens an opening.
Figure 6A:
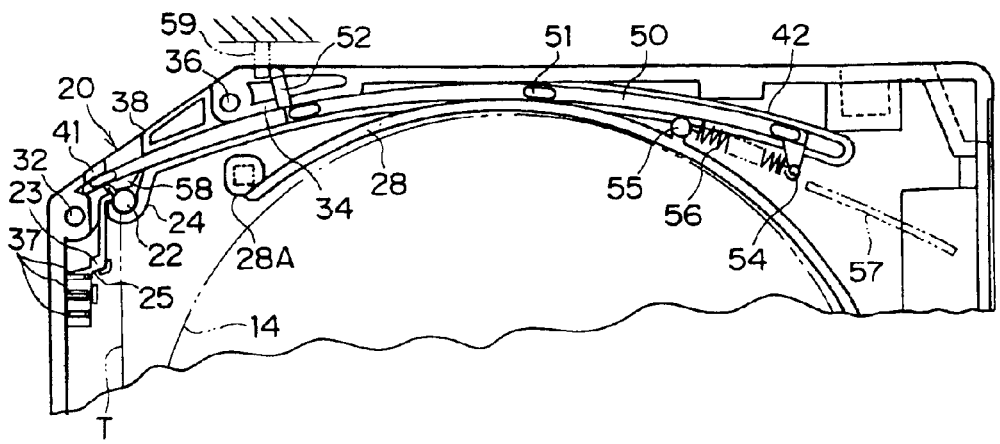
FIGS. 6A through 6C are schematic explanatory diagrams showing, in order, the processes of the door relating to the embodiment of the present invention opening the opening.
Figure 6B:
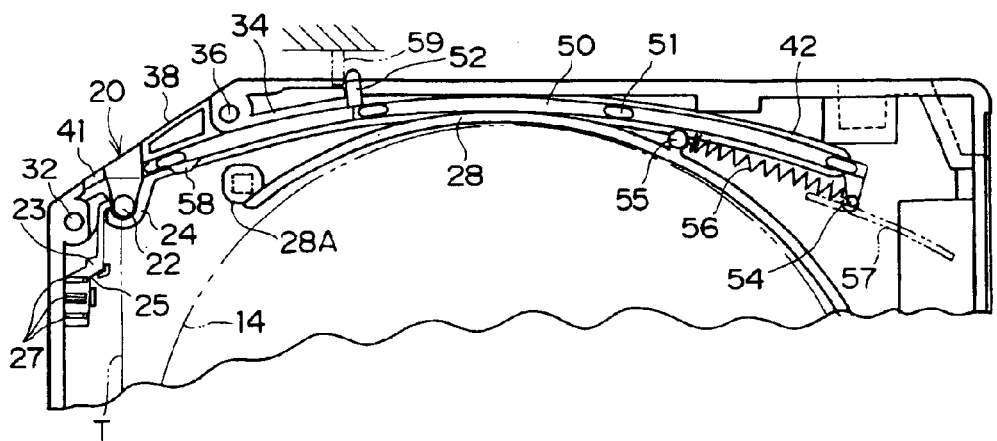
Figure 6C:
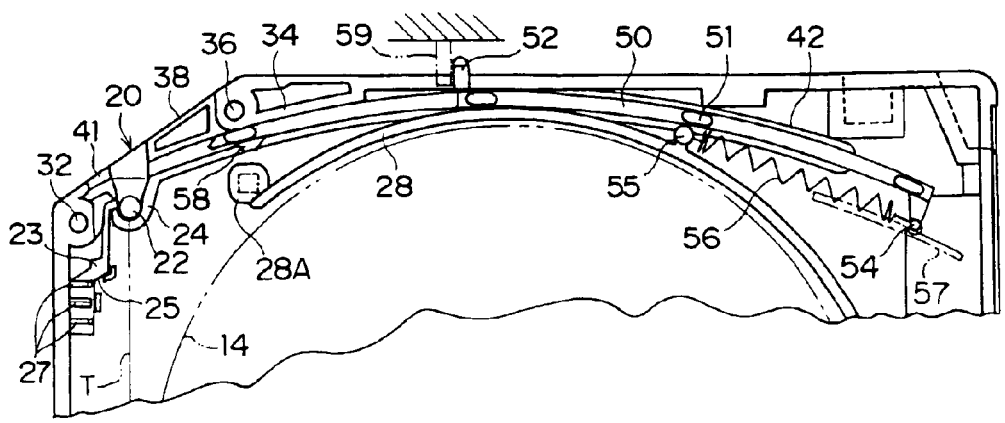

A pair of upper and lower pin holding portions 24, which position and hold the leader pin 22 at the interior of the case 12, are provided at the inner side of the opening 20 of the case 12, i.e., at the inner surface of the ceiling plate of the upper case 16 and at the inner surface of the floor plate of the lower case 18. As shown in FIGS. 3 and 4, the pin holding portions 24 are formed in substantially semicylindrical shapes as seen in plan view, such that the magnetic tape T pull-out sides thereof are open. The end portions of the leader pin 22, which is in a state of standing upright, are held in concave portions 24A of the pin holding portions 24 so as to be able to enter therein and exit therefrom from the open sides thereof.

In vicinities of the pin holding portions 24, a proximal portion of a plate spring 25 is inserted and fixed in spring holding portions 27 and groove portions 23 (see FIGS. 3 and 4) which are provided at the inner surface of the front wall 12A. (The front wall 12A is the portions of the peripheral walls 16A, 18A where the outer surfaces face in the direction of arrow A.) The distal ends (free ends) of the plate spring 25, which have been divided so as to be forked in two, engage with the upper and lower end portions of the leader pin 22 and hold the leader pin 22 in the pin holding portions 24. When the leader pin 22 enters into and exits from the pin holding portions 24, the distal end portions of the plate spring 25 elastically deform appropriately so as to permit movement of the leader pin 22.

Further, a gear opening 26, which is for exposing an unillustrated reel gear of the reel 14 to the exterior, is formed in the central portion of the lower case 18. The reel 14 is driven to rotate within the case 12 by the reel gear meshing with a driving gear of a drive device. Further, the reel 14 is held so as to not joggle by play restricting walls 28 which project out at portions of the inner surfaces of the upper case 16 and the lower case 18, and which serve as inner walls which are on a circular locus which is coaxial with the gear opening 26.

A bag portion (concave portion) 28A, in which a hole for position regulation is formed, is provided so as to be continuous with the end portion of the play restricting wall 28 in a vicinity of the opening 20. Further, a bag portion 29, in which is formed a hole for position regulation which is a long hole, is provided so as to be set apart from the play restricting wall 28 at the inner side of the front left corner portion of the case 12. The bag portions 28A, 29 are disposed on a single straight line which extends along the direction of arrow B. The end portions of the play restricting walls 28, except for the end portion thereof at which the bag portion 28A is continuous, are continuous with the peripheral wall 16A or the peripheral wall 18A of the case 12, so as to partition the outer sides of the play restricting walls 28 and the space at which the reel 14 is set.

A memory board M, which stores various types of information, is set at the rear right portion of the lower case 18 for each recording tape cartridge 10. A rear portion inner wall 18B is formed at an inclined surface of a predetermined angle, and the memory board M is supported by supporting projections 19 so as to be inclined at a predetermined angle, such that sensing is possible at a drive device which reads from the bottom surface side and at a library device (a device which accommodates a plurality of the recording tape cartridges 10 and which automatically loads and removes the recording tape cartridges 10 from drive devices) which reads from the rear wall side.

Further, an unillustrated write protect portion, which is set so that recording onto the recording tape cartridge 10 is possible or is not possible, is provided at the left rear portion of the lower case 18. An open hole 17, through which projects a recognition portion (not illustrated), by which the setting of the write protect portion is recognized, is formed in the left rear portion of the lower case 18.

A pair of top and bottom inclined wall portions 30, which are short and which prescribe the front edge portion of the opening 20, are formed at the right end portion of the front wall 12A of the case 12. The inclined wall portions 30 are bent along the plane of opening of the opening 20. The inclined wall portions 30 serve as dustproofing walls such that no space through which dust or the like can enter arises, due to the distal end of a door 50, which is substantially arc-shaped in plan view and which will be described later, entering in at the inner side of the inclined wall portions 30 when the opening 20 is closed. Further, a pair of upper and lower screw bosses 32 are continuous with the inner side of the front wall 12A in vicinities of the left sides of the inclined wall portions 30.

A pair of upper and lower inclined wall portions 34, which are shaped, in plan view, so as to substantially follow along the outer peripheral surface of the door 50, are provided at inner side of the front end portion of a right wall 12B of the case 12. (The right wall 12B is the portions of the peripheral walls 16A, 18A where the outer surfaces thereof face in the direction of arrow B.) The front end surfaces of the inclined wall portions 34 prescribe the rear edge of the opening 20. A pair of upper and lower screw bosses 36 are provided at the front end portions of the inclined wall portions 34.

A slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting-out the lower portion of the front side of the peripheral wall 16A of the upper case 16 which forms the right wall 12B, and the slit 40 opens toward the opening 20 as well. Forming the slit 40 in this way such that a portion of the peripheral wall 16A remains at the upper side is preferable in that the rigidity of the case 12 can be maintained. In particular, it is more preferable that the upper side wall prescribing the slit 40 be integral and continuous with the inclined wall portion 34.

A concave portion 48 is formed at the rear side of the lower case 18. The portion of the concave portion 48, other than the upper end of the peripheral wall 18A, is recessed toward the inner side of the case 12 in a substantially U-shaped configuration as seen in cross-sectional view, and is recessed upwardly from the bottom surface of the case 12 as well (the floor plate is cut-out). The concave portion 48 is formed at the left wall of the case 12 as well. The concave portions 48 are engagement portions which, for example, a pull-in mechanism of a drive device engages. The floor surfaces (the downwardly-facing surfaces) of the concave portions 48 serve as reference surfaces for positioning within a drive device.

Concave portions 46 are formed at the rear sides of the concave portions 48. The portion of the concave portion 46, other than the upper end of the peripheral wall 18A, is recessed toward the inner side of the case 12 in a substantially U-shaped configuration as seen in cross-sectional view, and is recessed upwardly from the bottom surface of the case 12 as well (the floor plate is cut-out). The concave portions 46 are engagement portions which a grasping mechanism of a library device engages. By providing the concave portions 46, 48, the torsional strength of the case 12 (the lower case 18) is improved. Moreover, a concave portion 44, which is substantially trapezoidal as seen in plan view, is formed in the top surface portion of the left wall of the upper case 16. This concave portion 44 is an engagement portion which is engaged by a holding member (not shown) for canceling the rotational moment accompanying the movement of the door 50 in the direction of opening at the time of opening the opening 20.

Guide wall portions 42, which are predetermined heights (e.g., about 1.0 mm to 1.5 mm) and which support convex portions 51 of the door 50 which will be described later such that the convex portions 51 are nipped from both the inner surface side and the outer surface side, stand erect at the upper case 16 and the lower case 18 from a vicinity of the opening 20 to a vicinity of the region where the play restricting walls 28 are closest to the right wall 12B (hereinafter, these portions will be called the front half guide wall portions 42), and from a vicinity of the rear end of the slit 40 to a vicinity of the rear wall (hereinafter, these portions will be called the rear half guide wall portions 42).

The guide wall portions 42 are formed in substantial arc-shapes as seen in plan view, and have different lengths at the upper case 16 and the lower case 18. The guide wall portion 42 at the upper case 16 is formed such that the rear half side thereof is longer than that of the guide wall portion 42 at the lower case 18. This is because the memory board M is disposed so as to be inclined at a predetermined angle at the right wall 12B side of the rear portion inner wall 18B of the lower case 18.

Further, the rear end portions of the guide wall portions 42 are closed in substantial arc-shapes as seen in plan view, and restrict the convex portions 51 which are furthest toward the rear at both the top and bottom of the door 50 such that the door 50 cannot move any further rearward. The front end portions of the guide wall portions 42 extend to positions which, when the leader pin 22 is entering and exiting, do not impede the entry or exit of the leader pin 22 (in the illustrated structure, positions which are about half of the opening width of the opening 20 and which are further rearward than the pin holding portions 24).

Guide wall portions 41, whose rear end portions are open, stand erect in vicinities of the inclined wall portions 30 so as to be positioned on imaginary lines extending from the guide wall portions 42. The rear end portions of the guide wall portions 41 do not extend further rearward than the front ends of the pin holding portions 24, so as to not impede the entry and exit of the leader pin 22. The interval (groove width) of the guide wall portion 41 is formed so as to be slightly more narrow than the interval (groove width) of the guide wall portion 42.

Namely, the interval (groove width) of the guide wall portion 42 is slightly wider so as to permit dispersion in molding of the door 50 (dispersion in the curvature). The convex portions 51 of the door 50 slide within the guide wall portions 42 in a state in which there is a certain amount of joggling. Accordingly, at least the interval (groove width) of the guide wall portion 41 is substantially the same as the width of the convex portions 51 of the door 50 (the width including projections which will be described later). Due to the front most convex portions 51 being fit into the guide wall portions 41 when the opening 20 is closed, the door 50 can be held without joggling.

The guide wall portions 41 and the front half guide wall portions 42 are formed so as to be slightly lower than the rear half guide wall portions 42. Namely, for example, the heights of the guide wall portions 41 and the front half guide wall portions 42 are formed to be about 1 mm, whereas the heights of the rear half guide wall portions 42 are formed to be about 1.5 mm. This is in order to ensure, at the opening 20, space for entry of the pull-out mechanism of a drive device which engages and pulls-out the leader pin 22. Accordingly, as will be described later, the plate width (height) of the front half portion of the door 50 (at least the portion thereof which closes the opening 20) is formed to be larger (higher) by an amount corresponding to the amount by which the guide wall portions 41 and the front half guide wall portions 42 are made lower.

Further, ribs 38, which are substantially trapezoidal in plan view and which are integral with the guide wall portions 42 at the outer sides which are exposed from the opening 20, stand erect at the inner surface of the upper case 16 and the inner surface of the lower case 18 so as to be the same heights as these guide wall portions 42. The strength of the upper case 16 and the lower case 18 at the opening 20 portion is ensured by these ribs 38. Note that the inner side guide wall portion 42 is continuous and integral with the pin holding portion 24. The height of the pin holding portion 24 may be the same as the height of the guide wall portion 42 with which it is integral and continuous, but is preferably formed to be higher than the height of the guide wall portion 42 with which it is integral and continuous.

The upper case 16 and the lower case 18 which were described above are fixed (joined) together by unillustrated screws being screwed, from beneath, into the screw bosses 32, 36 which are positioned in the vicinities of the edge portions of the opening 20. In this way, the corner portions at both ends of the opening 20, which are prescribed by the free ends of the inclined wall portions 30 (the front wall 12A) and the inclined wall portions 34 (the right wall 12B) and which are disadvantageous in terms of strength and which easily hit the ground or the like when the case 12 is dropped, are joined together strongly. Even if the case 12 is dropped, it is difficult for the case 12 to deform or buckle, or for positional offset to arise thereat, due to the entire weight of the recording tape cartridge 10. Note that the abutting surfaces of the peripheral walls 16A, 18A (the corner portions at both sides of the opening 20) may be fixed together by welding. However, fixing together by screws is preferable in consideration of the ability to disassemble and the ability to recycle the case 12.

The plate thickness of the area at which the pin holding portions 24 are set is 2 mm at both the upper case 16 and the lower case 18 which is relatively thick. The case 12 (the upper case 16 and the lower case 18) is formed of a polycarbonate material (PC). This is in order to increase the strength in the vicinity of the pin holding portions 24 which demarcate the holding position of the leader pin 22 and which have one important function of the recording tape cartridge 10 which is enabling the leader pin 22 to be correctly anchored by the pull-out mechanism at the time when the magnetic tape T is pulled-out, and is in order for positional offset of the leader pin 22 to not arise due to the impact caused by the case 12 (the recording tape cartridge 10) being dropped or the like. Note that acrylonitrile butadiene styrene (ABS) can be used instead of polycarbonate material (PC) for the material of the case 12.

The position at which the pin holding portions 24 are set is determined such that the axial center of the leader pin 22 held by the pin holding portions 24 is positioned on a first imaginary straight line connecting the front and rear edge portions of the opening 20, or is positioned further toward the inner side of the case 12 than this first imaginary straight line. More preferably, the position at which the pin holding portions 24 are set is determined such that the axial center of the leader pin 22 is positioned on a second imaginary straight line connecting the axial centers of the two screw bosses 32, 36, or further toward the inner side of the case 12 than this second imaginary straight line. In addition, the pin holding portions 24 in the present embodiment are disposed at positions which are closer to the screw bosses 32 than the screw bosses 36. In this way, positional offset of the leader pin 22 due to vibrations of the ceiling plate and the floor plate accompanying dropping of the case 12 or the like can be prevented even more.

The angle of inclination, with respect to the direction of arrow A, of the plane of opening of the opening 20 (the angle of inclination of the ceiling plate and the floor plate of the case 12 which prescribe the top and bottom of the opening 20) is determined in accordance with the need to identify (recognize) the recording tape cartridge 10 at a library device. Namely, a library device is a device which accommodates a plurality of the recording tape cartridges 10, and automatically (i.e., without being aided by a human hand) loads and removes the recording tape cartridges 10 into and from drive devices. When there are plural types of recording tape cartridges 10 which are being handled and plural types of drive devices, there is the need to recognize the generations or the recording capacities or the like of the recording tape cartridges 10. The angle of inclination of the plane of opening of the opening 20 can be used for such recognition.

In this way, the opening 20 for pulling out of the magnetic tape T, which takes strength into consideration, also functions as a recognition portion at a library device in accordance with the angle of inclination of the plane of opening thereof (specifically, the angle of inclination of the ceiling plate and the floor plate which prescribe the top and bottom of the opening 20). Thus, it is possible to prevent the strength of the case 12 from being insufficient, the dustproof quality of the case 12 from deteriorating, and the structure of the mold from becoming complex, which would be of concern if the opening 20 and the recognition portion were provided separately (e.g., if one or plural through holes were formed in the case 12 as recognition portions). Note that, because the peripheral wall 16A of the upper case 16 and the peripheral wall 18A of the lower case 18 are formed to be the same heights, the machining accuracies of the abutting portions thereof (the accuracies of resin molding by a mold) are the same level, and the ability to assemble the case 12 and the drop impact resistance of the case 12 are good.

The opening 20 is opened and closed by the door 50 which serves as a shielding member. The plate width (height) of the portion of the door 50 which slides in the guide wall portions 41 and the front half guide wall portions 42 (i.e., at least the portion of the door 50 which closes the opening 20) is formed to be substantially the same as the opening height of the opening 20. The portion at the rear side thereof is formed to be slightly smaller (lower). The plate length of the door 50 is formed to be sufficiently larger than the opening width of the opening 20. The door 50 is formed in a substantial arc-shape as seen in plan view which curves along the direction of plate thickness, such that the door 50 can move along a predetermined circumference (see FIGS. 2 and 5).

The door 50 closes the opening 20 (see FIG. 6A) in a state in which the distal end portion of the door 50 enters in at the inner sides of the inclined wall portions 30. When the door 50 slides (rotates) substantially rearward along the aforementioned predetermined circumference so as to open the opening 20 (see FIG. 6B) and the outer peripheral surface of a vicinity of the distal end of door 50 reaches a vicinity of the screw bosses 36, the opening 20 is completely opened (see FIG. 6C). Further, the door 50 closes the opening 20 by sliding (rotating) in the direction opposite to the direction at the time of opening the opening 20.

The door 50 is curved in an arc-shape which corresponds to a predetermined circumference which is the locus of movement of the door 50. In the present embodiment, the center of rotation of the door 50 is set such that the left-right direction position thereof is in a vicinity of the left end of the case 12 and the front-back direction position thereof is in a vicinity of the rear end of the slit 40. In this way, the locus of movement of the door 50 comes closest to the right wall 12B of the case 12 in a vicinity of the rear end of the slit 40. Note that the center of rotation and the radius of the door 50 may be appropriately determined in accordance with the positions of the front and rear edge portions of the opening 20 (the inclined wall portions 30 and the screw bosses 36) which are determined in accordance with requirements of drive devices, or the angle of the plane of opening of the opening 20 which is determined in accordance with requirements of library devices, or the like.

The curved longitudinal dimension of the door 50 is determined such that, in both of a state in which the door 50 opens the opening 20 and a state in which the door 50 closes the opening 20, the rear end portion of the door 50 is positioned in the right rear corner portion of the case 12, which is further toward the rear than the concave portion 48 (i.e., the right rear corner portion in a vicinity of the concave portion 46). The bottom rear portion of the door 50 is cut obliquely in order to avoid the memory board M which is disposed so as to be inclined at a predetermined angle at the rear portion inner wall 18B of the lower case 18. Note that the inner surface and/or the outer surface at the distal end portion (front end portion) of the door 50 is preferably formed as a tapered surface so as to smoothly enter into the guide wall portions 41.

The convex portions 51 project from the top surface and the bottom surface of the door 50. The convex portions 51 abut the guide surfaces of the guide wall portions 41 and the guide wall portions 42 (the inner surfaces which oppose each other) and the inner surface of the upper case 16 and the inner surface of the lower case 18 between the guide wall portions 41 and the guide wall portions 42, and guide the door 50 in the directions of opening and closing the opening 20. The convex portions 51 are formed in substantially oval shapes as seen in plan view which are long along the longitudinal direction of the door 50. Four convex portions 51 project at each of the upper surface and the lower surface of the door 50 so as to have top/bottom symmetry (except for the convex portions 51 furthest toward the rear), and so as to project to substantially the same heights as the heights of the guide wall portions 41 and the guide wall portions 42. (For example, the portion of the door at the front side of a border portion where the plate width of the door 50 changes is about 0.5 mm, and the portion of the door at the rear side of this border portion is about 1.5 mm.) Note that the convex portions 51 furthest toward the rear do not have top/bottom symmetry because the bottom rear portion of the door 50 is cut obliquely.

The distal end of the convex portion 51 is formed in a substantial arc-shape as seen in cross-sectional view (side view). Projections (not illustrated), which are substantially arc-shaped in plan view or are substantially triangular in plan view or the like, project along the entire height of the convex portion 51 at the both side surfaces of the convex portion 51. Accordingly, when the convex portions 51 are inserted between the guide wall portions 42 and slide, only the substantially arc-shaped distal ends of the convex portions 51 contact the inner surface of the upper case 16 and the inner surface of the lower case 18 such that linear contact arises thereat, and only the substantially arc-shaped or the like distal ends of the projections contact the mutually opposing guide surfaces of the guide wall portions 42 such that linear contact similarly arises thereat.

Thus, the sliding resistance (friction) between, on the one hand, the top and bottom convex portions 51, and, on the other hand, the inner surface of the upper case 16 and the inner surface of the lower case 18 between the guide wall portions 41 and the guide wall portions 42 and the guide surfaces of the guide wall portions 41 and the guide wall portions 42, can be reduced, and the door 50 can be slid smoothly with little resistance. Note that, when the convex portions 51 are formed in substantially oval shapes as seen in plan view, the impact resistance thereof is better than if, for example, the convex portions 51 were to be formed in substantially circular shapes as seen in plan view. Thus, even if force is applied to the door 50 from a direction other than the opening/closing directions due to the impact of a drop or the like, there is no fear that the convex portions 51 will break.

An operation projection 52 serving as an operation portion projects along the radial direction of the door 50 from the outer peripheral surface of the door 50 at a region which is slightly further forward than the longitudinal direction central portion of the door 50 (a vicinity of the border portion where the plate width of the door 50 changes). The operation projection 52 is exposed to the exterior of the case 12 from the slit 40. In the state in which the opening 20 is closed, the operation projection 52 is positioned so as to be slightly set apart from the rear end of the screw boss 36, and can be operated from the portion of the slit 40 which opens toward the front. Further, in the state in which the opening 20 is open, the operation projection 52 is positioned so as to be slightly set apart from the rear edge of the slit 40. At this time, the rear most convex portions 51 abut the rear end portions of the guide wall portions 42.

Although the interior and the exterior of the case 12 communicate via the slit 40 for exposing the operation projection 52, adhesion of dust and the like to the magnetic tape T wound on the reel 14 is prevented by the play restricting walls 28 serving as inner walls, and due to the fact that the slit 40 is always substantially closed by the screw boss 36 and by the door 50 which extends over substantially the entire height in the case 12.

Further, stoppers 58, which abut the upper end portion side surface and the lower end portion side surface of the leader pin 22 when the opening 20 is closed, project at the inner surface of the front end portion of the door 50. The stoppers 58 even further prevent the leader pin 22 from falling out from the pin holding portions 24 due to impact at the time the magnetic tape cartridge 10 is dropped or the like. Further, a coil spring 56, which serves as an urging member which urges the door 50 in the direction of closing the opening 20, has a length such that it extends to the rear right corner portion of the case 12 in the state in which the door 50 closes the opening 20. Thus, the space between the play restricting walls 28 and the right wall 12B (the peripheral walls 16A, 18A) at the rear right corner portion can be utilized effectively.

Namely, a spring holding portion 54, which is substantially L-shaped in rear view, projects integrally at the inner peripheral surface of the door 50 in the vicinity of the rear end thereof, so as to be directed upwardly. A solid cylindrical spring anchor projection 55 projects upwardly at the inner surface of the lower case 18 in a vicinity of the concave portion 48. Ring-shaped attachment portions 56A, 56B are formed at the both ends of the coil spring 56. Accordingly, the one attachment portion 56B of the coil spring 56 is placed on the spring anchor portion 55 from above such that the spring anchor portion 55 is inserted through the attachment portion 56B, and the other attachment portion 56A is placed on the spring holding portion 54 from above such that the spring holding portion 54 is inserted through the attachment portion 56A. The coil spring 56 can thereby be attached simply within the aforementioned space.

A rib 57, which the top end of the spring holding portion 54 slidingly contacts at the time when the door 50 is opening and closing, stands erect in a substantial arc-shape in plan view at the upper case 16. The rib 57 is disposed at a position and has a length such that the top end of the spring holding portion 54 can slidingly contact the rib 57 at least when the door 50 starts to move (open). Due to the rib 57 suitably guiding the spring holding portion 54 which moves against the urging force of the coil spring 56, the door 50 can be opened more stably (i.e., at the time of opening, the door 50 does not shake due to the urging force of the coil spring 56).

Further, by providing the rib 57, even if the attachment portion 56A of the coil spring 56 rises up along the spring holding portion 54 due to an impact caused by a drop or the like being applied to the case 12, the attachment portion 56A does not come off of the spring holding portion 54. Note that the top end of the spring anchor portion 55 is inserted between the play restricting wall 28 and the guide wall portion 42 of the upper case 16. Thus, in the same way, the attachment portion 56B can be prevented from coming off of the spring anchor portion 55. Further, the door 50 is molded of, for example, polyoxymethylene (POM) resin which has better wear resistance and a lower coefficient of friction than the case 12 which is formed of polycarbonate material (PC). However, the operation projection 52 and the spring holding portion 54 may be formed as separate bodies (of separate materials).

Figure 7:
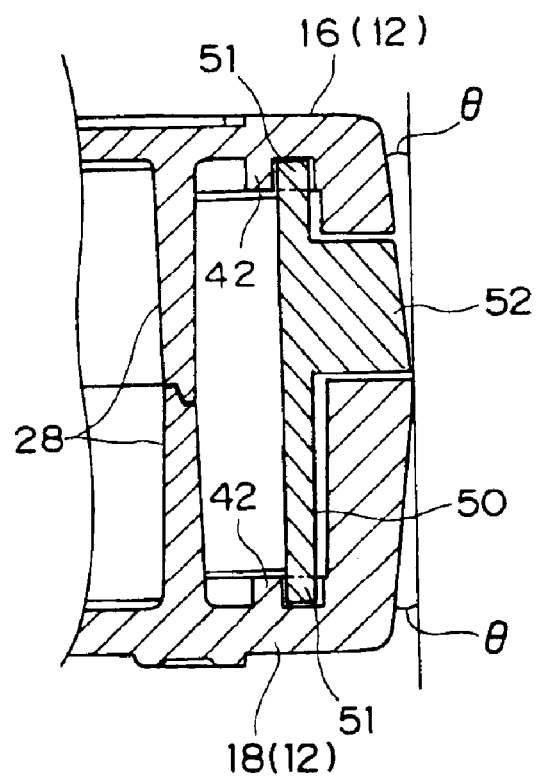
FIG. 7 is a schematic side sectional view showing the configuration of an operation projection of the door.
Figure 8:
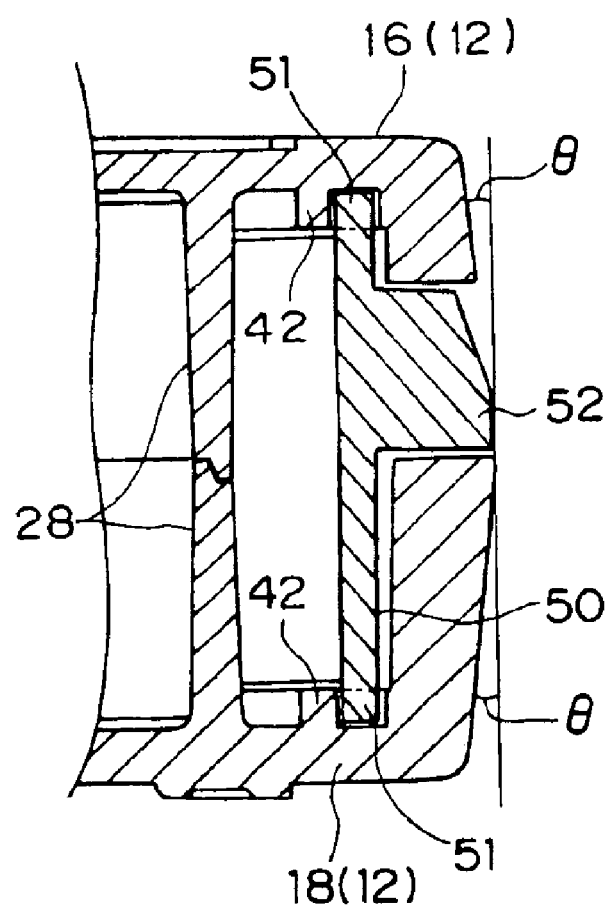
FIG. 8 is a schematic side sectional view showing another configuration of the operation projection of the door.
Figure 9:
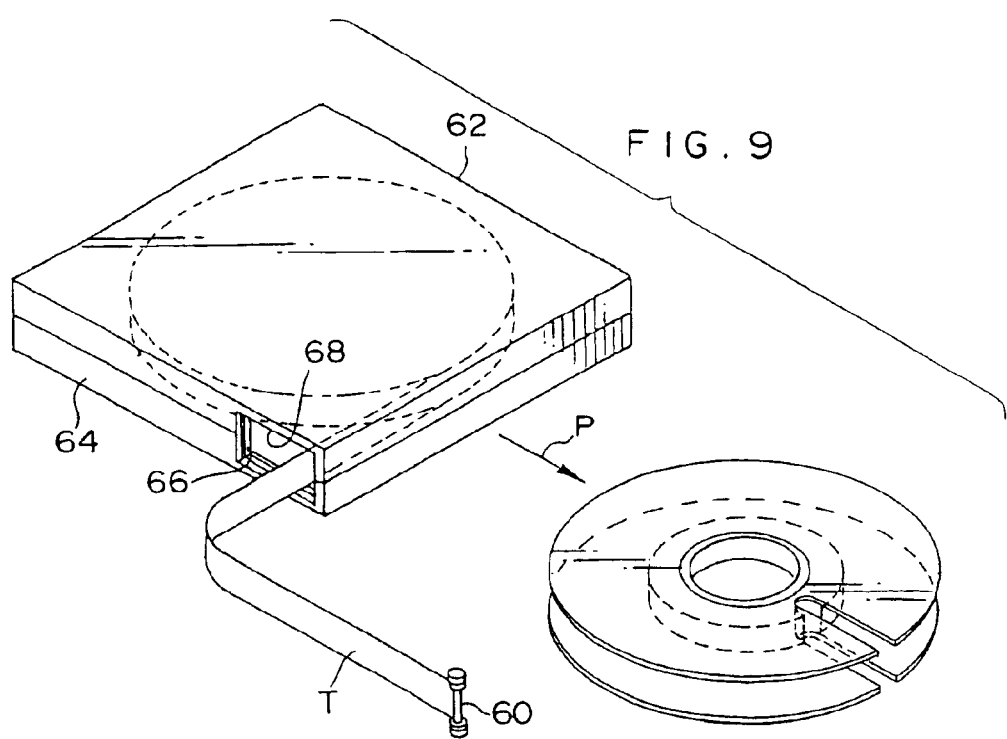
FIG. 9 is a schematic perspective view of a conventional magnetic tape cartridge equipped with a leader pin.
Figure 10:
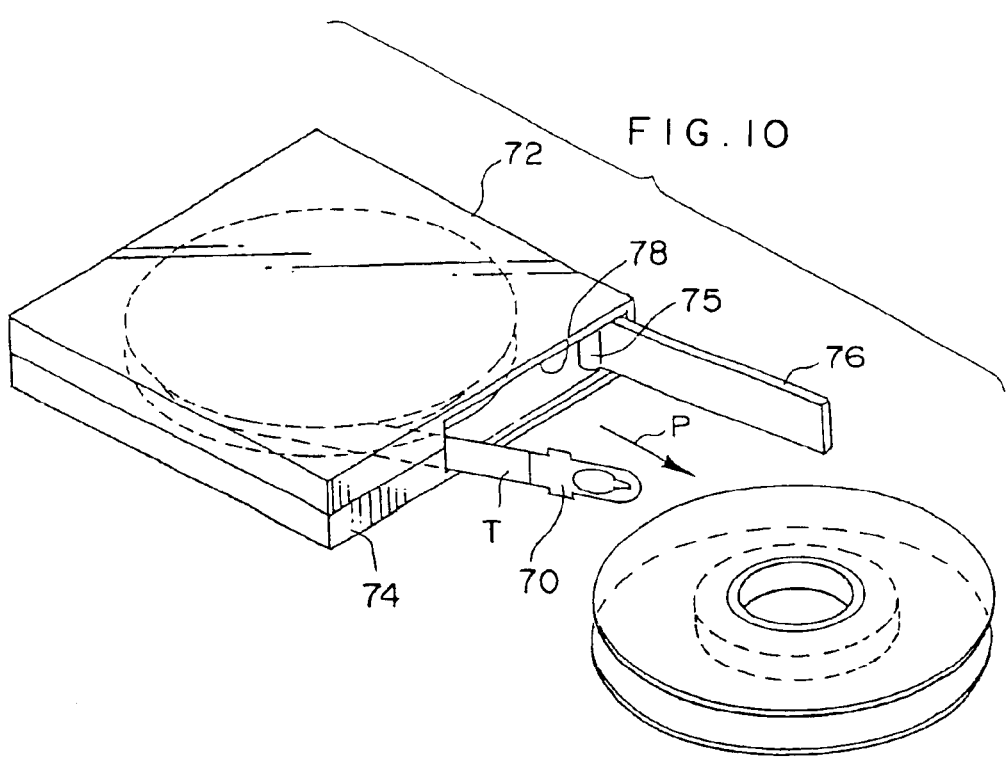
FIG. 10 is a schematic perspective view of a conventional magnetic tape cartridge equipped with a leader tape.
Figure 11:
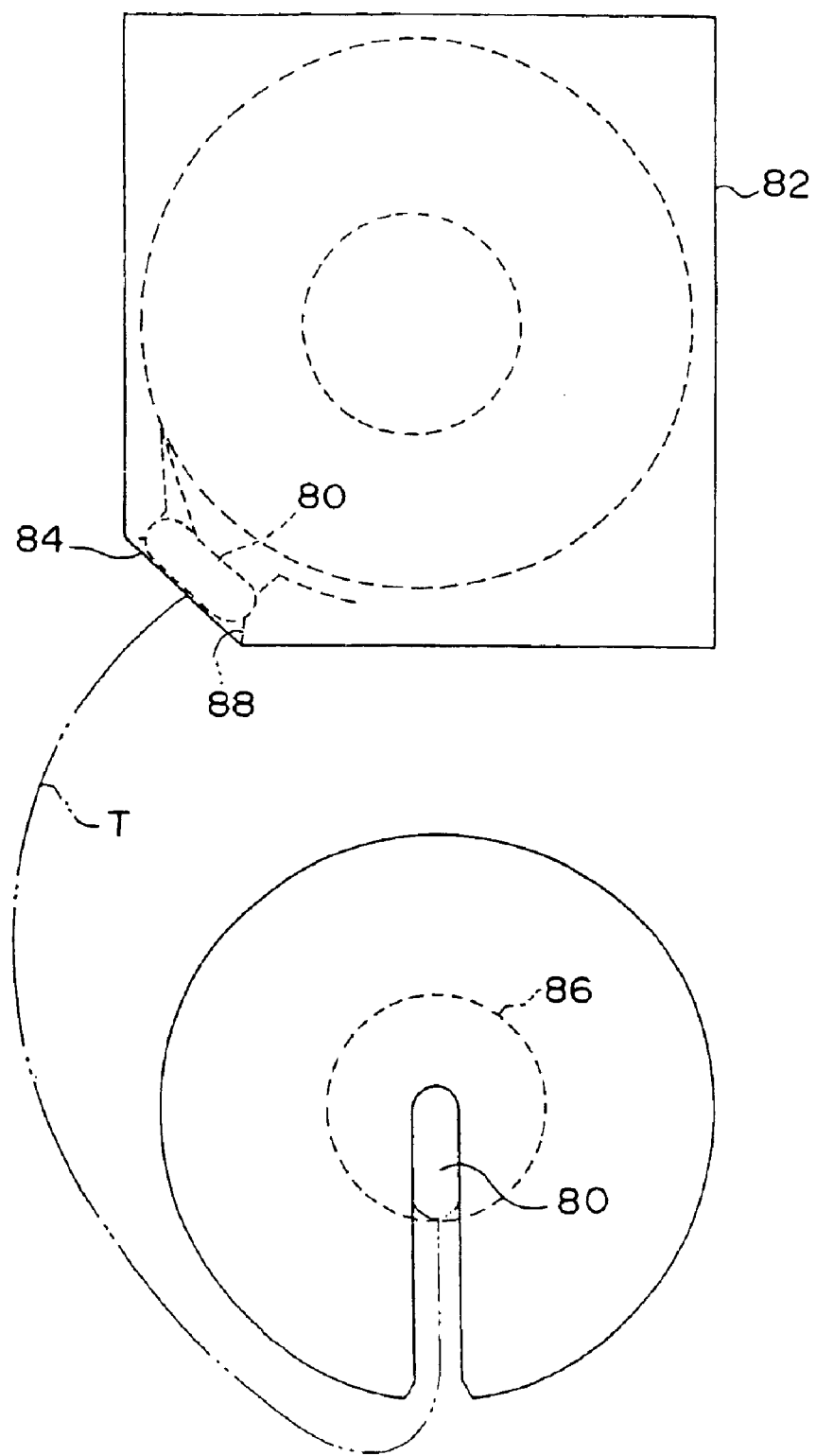
FIG. 11 is a schematic plan view of a conventional magnetic tape cartridge equipped with a leader block.

Here, as described above, the upper case 16 and the lower case 18 are formed of synthetic resin, and the case 12 is assembled by the upper case 16 and the lower case 18 being joined together by the peripheral walls 16A, 18A thereof abutting one another. Accordingly, a draft for facilitating removal from a mold for molding is formed at the peripheral walls 16A, 18A. As shown in FIG. 7, the draft is an angle of inclination θ of the peripheral walls 16A, 18A with respect to the vertical direction when seen from the side surfaces thereof, from the ceiling plate of the upper case 16 and extending over the peripheral wall 16A, and from the floor plate of the lower case 18 and extending over the peripheral wall 18A. Usually, θ is about 1° to 2°.

Accordingly, the distal end surface of the operation projection 52, which is exposed from the slit 40 which is formed by cutting the lower portion of the front side of the peripheral wall 16A (the right wall 12B) is also cut at an incline in accordance with this draft θ, so as to not project outward when the opening 20 is closed. Namely, as shown in the side sectional view of FIG. 7, the distal end surface of the operation projection 52 is formed as an inclined surface which is inclined along the configuration of the outer surface (the draft θ) of the peripheral wall 16A (the right wall 12B), i.e., the distal end surface of the operation projection 52 is substantially flush with (or parallel to) the outer surface of the peripheral wall 16A. At least when the opening 20 is closed (at the time when the recording tape cartridge 10 is not being used such as is being stored or the like), the distal end surface of the operation projection 52 does not project further outwardly than the peripheral wall 16A (the right wall 12B).

Thus, when the recording tape cartridge 10 is not in use, no trouble arises, such as a finger or the like accidentally contacts the operation projection 52 such that the door 50 is slid and the opening 20 is opened. Moreover, this structure is preferable from the standpoint of the external appearance as well. In addition, because there is no portion at the recording tape cartridge 10 which projects toward the outer side, the design of the insertion opening, the bucket, and the like of the drive device in which the recording tape cartridge 10 is loaded in this state, can also be made to be compact. Note that the configuration of the distal end surface of the operation projection 52 may be a configuration such as that shown in FIG. 8. It suffices for the distal end surface of the operation projection 52 to be able to engage with an engagement projection 59 which will be described later, and to be a configuration which is substantially flush with respect to the peripheral wall 16A (the right wall 12B).

Next, operation of the present embodiment will be described. When the recording tape cartridge 10 having the above-described structure is not being used (i.e., is being stored, is being transported, or the like), the opening 20 is closed by the door 50. Specifically, due to the urging force of the coil spring 56, the door 50 is always urged in the direction of closing the opening 20, and closes the opening 20 in a state in which the distal end portion (front end portion) of the door 50 has entered in the guide wall portions 41 which are in a vicinity of the inclined wall portions 30.

On the other hand, when the magnetic tape T is to be used, the recording tape cartridge 10 is loaded into a drive device along the direction of arrow A. Accompanying this loading, the engagement projection 59 (see FIGS. 6A, 6B and 6C), which serves as an opening/closing member forming an opening/closing mechanism of the drive device, enters into the slit 40 which opens toward the front, and engages with the operation projection 52 of the door 50 (see FIG. 6A). In this state, when the recording tape cartridge 10 (the case 12) is pushed in further, due to the pushing-in force, the engagement projection 59 moves the operation projection 52 rearward against the urging force of the coil spring 56 (i.e., moves the operation projection 52 rearward relative to the case 12 which is loaded in the direction of arrow A) (see FIG. 6B).

Then, while the convex portions 51 are guided by the guide wall portions 42 and the spring holding portion 54 is guided by the rib 57, the door 50, from which the operation projection 52 projects, rotates clockwise as seen in plan view along the direction of curving thereof. Namely, due to the guide wall portions 42, the door 50 moves substantially rearward so as to circle around the outer sides of the pin holding portions 24 and the reel 14 without jutting out from the locus of movement along the curved configuration of the door 50, and opens the opening 20 (see FIG. 6C). Then, when the case 12 (the recording tape cartridge 10) is loaded to a predetermined depth in the drive device, the opening 20 is completely opened.

When the recording tape cartridge 10 is positioned within the drive device in this state in which the opening 20 is opened, further rotation (substantially rearward movement) of the door 50 is restricted. The pull-out mechanism of the drive device enters into the case 12 from the opening 20 which has been opened. The pull-out mechanism pulls-out the leader pin 22 which is positioned and held at the pin holding portions 24. At this time, the distal ends of the anchor spring 25 elastically deform appropriately, such that pulling-out of the leader pin 22 from the pin holding portions 24 is permitted. Then, the leader pin 22 is accommodated at a take-up reel (not shown), and the take-up reel and the reel 14 are driven to rotate synchronously. Thus, the magnetic tape T is successively pulled-out from the case 12 while being taken-up onto the take-up reel. Information is recorded or played back by a recording/playback head or the like disposed along a predetermined tape path.

On the other hand, when the magnetic tape T is rewound onto the reel 14 and the leader pin 22 is to be held at the pin holding portions 24, the distal ends of the anchor spring 25 elastically deform appropriately such that entry of the leader pin 22 into the pin holding portions 24 is permitted. When the recording tape cartridge 10 is to be ejected from the drive device, the positioned state of the recording tape cartridge 10 is cancelled, and the recording tape cartridge 10 is moved in the direction opposite to the direction of arrow A by the urging force of the coil spring 56 or by an unillustrated ejecting mechanism. In this way, the door 50 is rotated in the direction of closing the opening 20 by the urging force of the coil spring 56, while the convex portions 51 are guided by the guide wall portions 42. Due to the distal end portion (front end portion) of the door 50 entering into the guide wall portions 41, the opening 20 is completely closed and returned to its initial state.

Here, the opening 20 is formed by cutting off a corner portion (the loading side front right corner portion) of the rectangular case 12. Thus, the plane of opening of the opening 20 is directed in the direction of arrow A and the direction of arrow B (the plane of opening is inclined with respect to the direction of arrow A). Accordingly, the area at which the pin holding portions 24, which hold the leader pin 22, can be set is broad, and the region over which the pull-out mechanism of the drive device can engage the leader pin 22 is broad. Thus, the position at which the pin holding portions 24 are set can be set in accordance with the specifications of the drive device which engages the leader pin 22 from the direction of arrow A or the direction of arrow B. Therefore, the degrees of freedom in designing the drive device also are increased.

In other words, because the range of directions over which the pull-out mechanism of the drive device can access the leader pin 22 is broad, the pull-out mechanism can access the leader pin 22 from the front surface side of the case 12 which faces in the direction of arrow A, and there is no need for the pull-out mechanism to access the leader pin 22 from the outer side (the arrow B side) of the arrow B side peripheral walls (side walls) 16A, 18A. Thus, in the drive device, the path for pulling-out the magnetic tape T can be made to be the shortest, and there is no need for a driving mechanism for making the pull-out mechanism circle around from the arrow B side of the case 12. Thus, the drive device can be made to be more compact and less expensive. Note that, when the path along which the magnetic tape T is pulled out is made to be the shortest, the path of the magnetic tape T also becomes short as a matter of course. Thus, the contact wear between the magnetic tape T and a tape guide (e.g., a roller or the like which is rotatably supported) can be decreased.

The door 50, which is curved in an arc-shape, opens and closes the opening 20 by rotating so as to circle around the outer sides of the reel 14 and the pin holding portions 24 (the leader pin 22), without jutting out from the locus of movement which runs along the curved configuration of the door 50 (a locus which runs substantially along the outer peripheral portion of the reel 14). Thus, at the time of opening and closing the opening 20, the door 50 does not jut out from the region prescribed by the outer shape of the case 12.

Thus, the space for accommodating the recording tape cartridge 10 within the drive device is small, the drive device can be made compact, and the space within the drive device can be used effectively. Moreover, the locus of movement of the door 50 does not interfere with the pin holding portions 24 (the leader pin 22) or the reel 14 within the case 12, and the door 50 can be structured within a small space. Therefore, the space within the case 12 can be utilized effectively.

Moreover, it suffices for the engagement projection 59 of the drive device to merely enter in from the front of the slit 40 and to be fixed so as to be able to engage with the operation projection 52 of the door 50. Thus, a simple structure suffices. Moreover, because the door 50 closes the opening 20 due to the urging force of the coil spring 56, there is no need at the drive device for a mechanism for driving the door 50 in the direction of closing the opening 20. The structure of the opening/closing mechanism of the drive device can be made even more simple.

In this way, in the recording tape cartridge 10 relating to the present embodiment, the door 50, which can make the space for accommodating the recording tape cartridge 10 within a drive device compact, opens and closes the opening 20, which is structured such that the path for pulling-out the magnetic tape T can be the shortest, without the door 50 interfering with the reel 14 and the leader pin 22. Further, the engagement projection 59, which serves as an opening/closing mechanism (opening/closing member) which operates the door 50 so as to open and close the opening 20, can be made to have a simple structure.

Moreover, as described above, the locus of movement of the door 50 is a circumference (the shape of a curve). Thus, it is possible to form the opening 20 to be large by cutting off a large amount of a corner portion of the case 12. Namely, in a case in which the opening 20, which is inclined with respect to the direction of arrow A, is opened and closed by a flat-plate-shaped shielding member for example, when an attempt is made to accommodate this shielding member within the region of the outer shape of the case 12 in the state in which the opening 20 is open, the opening 20 must be opened and closed while changing the posture of the shielding member by rectilinear movement and rotational movement, and the region over which the shielding member operates is large. The opening 20 must be made small (the cut-off amount of the corner portion of the case 12 at which the opening 20 is formed must be made small) in order for the region of operation of the shielding member to not interfere with the leader pin 22 and the reel 14. However, in the recording tape cartridge 10 relating to the present embodiment, as described above, the opening 20 can be made large by providing the door 50 which opens and closes the opening 20 by rotating without jutting out from the predetermined circumference.

In particular, the center of rotation of the door 50 for opening and closing the opening 20 whose plane of opening is inclined with respect to the direction of arrow A, can be determined independently of the axially central position of the reel 14. Thus, the angle of inclination of the plane of opening of the opening 20 with respect to the direction of arrow A, the size of the opening 20 (the distance between the front and rear edge portions thereof), and the like can be set arbitrarily, and it is possible to obtain the door 50 which opens and closes the opening 20 of an arbitrary configuration and arbitrary dimensions corresponding to the requirements of drive devices and the like. Namely, with a structure having the door 50, the degrees of freedom in designing the opening 20 (the recording tape cartridge 10) are increased.

The door 50 is a separate member from the leader pin 22 which is pulled out from the case 12. Thus, in the assembled state, it is not possible to remove the door 50 from the case 12. Namely, the door 50 does not come out from the case 12 due to impact or the like when the recording tape cartridge 10 is dropped. On the other hand, when the magnetic tape T is not in use, the leader pin 22 is accommodated within the case 12 which is in a sealed state in which the opening 20 is closed by the door 50, and it is difficult for the leader pin 22 to become scratched or dirtied. Thus, the pulling-out and the conveying of the magnetic tape T within a drive device are not adversely affected, and the magnetic tape T itself is not damaged.

The door 50 opens and closes the opening 20 by sliding in a state in which the convex portions 51, which are substantially oval in plan view, are supported between the guide wall portions 42 which are provided parallel at the inner surfaces of the case 12. Thus, there is no need to form a groove or the like in the inner surface of the case 12 as in the conventional art. Accordingly, the rigidity of the case 12 does not deteriorate. Moreover, because the convex portions 51 are formed in substantially oval shapes as seen in plan view, even if they receive a force from a direction other than the opening/closing direction of the door 50 due to the recording tape cartridge 10 being dropped or the like, there is no fear that the convex portions 51 will break.

The distal end surface of the operation projection 52 which is exposed from the slit 40 is cut at an incline in accordance with the draft θ of the peripheral wall 16A (the right wall 12B). When the opening 20 is closed (i.e., when the magnetic tape cartridge 10 is not being used such as is being stored or the like), the distal end surface of the operation projection 52 does not project further outwardly than the peripheral wall 16A (the right wall 12B). Thus, no trouble arises, such as a finger or the like accidentally contacts the operation projection 52 such that the door 50 is slid and the opening 20 is opened. Moreover, this structure is preferable from the standpoint of the external appearance as well. Further, because there is no portion at the recording tape cartridge 10 which projects outwardly when the recording tape cartridge 10 is not in use, the design of the insertion opening, the bucket, and the like of the drive device in which the recording tape cartridge 10 is loaded in this state, can also be made to be compact.

As described above, in accordance with the present invention, the distal end surface of an operation portion of a shielding member, which is exposed from a slit formed by cutting-out a peripheral wall of a case, is formed so as to be substantially flush with the peripheral wall or is inclined along the draft of the peripheral wall when an opening is closed. Therefore, when the recording tape cartridge is not being used, there is no member which projects out at the recording tape cartridge. Accordingly, an insertion opening, a bucket, and the like of the drive device in which the recording tape cartridge is loaded in this state, can also be made to have compact designs. Moreover, when the recording tape cartridge is not being used, trouble, such as a finger or the like accidentally contacting the operation portion such that the opening is opened, or the like does not arise.

The opening is formed by cutting off a corner portion of the case at the side of loading the case into a drive device. Thus, the plane of opening of the opening can be made to face toward the drive device, and the pull-out mechanism of the drive device can enter into the case from the front side thereof. Thus, the path along which the recording tape is pulled out can be made to be the shortest. Accordingly, there is no need at the drive device for a complex mechanism for making the recording tape circle around. It is possible to design a drive device which is compact and whose manufacturing cost is inexpensive.

What is claimed is:

1. A recording tape cartridge which is loaded into a drive device for use, the recording tape cartridge comprising:
    a case for rotatably accommodating, at an interior of the case, a reel on which a recording tape is wound, the case having an opening for pulling-out of the recording tape from the interior of the case; and
    a shielding member, slidably held at the case, for closing the opening,
    wherein the case has a peripheral wall having an outer surface, and a projection is provided at the shielding member with the projection being exposed from the outer surface of the peripheral wall, such that, due to the cartridge moving in a predetermined direction for loading the cartridge into a drive device, the projection abuts one portion of the drive device and can be moved relative to the peripheral wall, whereby the shielding member opens the opening,
    wherein the projection has an end surface which, in a state in which the shielding member closes the opening, is flush with at least one portion of the outer surface of the peripheral wall, and
    wherein a slit, which exposes the projection from the outer surface of the peripheral wall, is formed in the peripheral wall, and the slit extends parallel to the predetermined direction for loading and permits relative movement.

2. The recording tape cartridge of claim 1, wherein one end of the slit is formed so as to open at the opening.

3. The recording tape cartridge of claim 1, wherein the case has an upper case and a lower case, and the upper case and the lower case are joined together such that there is an accommodating space therebetween, and the upper case and the lower case have wall portions, and the wall portions have end edge portions which are joined together, and the slit is formed by cutting one portion of the end edge portion of one of the wall portions of the upper case and the lower case.

4. The recording tape cartridge of claim 1, wherein the shielding member is urged in a direction of closing the opening.

5. The recording tape cartridge of claim 1, wherein a direction of closing the opening substantially coincides with the predetermined loading direction.

6. The recording tape cartridge of claim 1, wherein the peripheral wall has a side wall and a front wall with respect to the predetermined direction for loading, and the opening is provided at a corner portion between the side wall and the front wall.

7. The recording tape cartridge of claim 1, wherein a corner portion has a surface which is inclined with respect to the predetermined direction for loading, and the opening is formed at said surface.

8. A recording tape cartridge which is loaded into a drive device for use, the recording tape cartridge comprising:
    a case for rotatably accommodating, at an interior of the case, a reel on which a recording tape is wound, the case having an opening for pulling-out of the recording tape from the interior of the case; and
    a shielding member, slidably held at the case, for closing the opening,
    wherein the case has a peripheral wall having an outer surface, and a projection is provided at the shielding member with the projection being exposed from the outer surface of the peripheral wall, such that, due to the cartridge moving in a predetermined direction for loading the cartridge into a drive device, the projection abuts one portion of the drive device and can be moved relative to the peripheral wall, whereby the shielding member opens the opening,
    wherein the projection has an end surface which, in a state in which the shielding member closes the opening, is flush with at least one portion of the outer surface of the peripheral wall, and
    wherein the case has an upper case and a lower case, and the upper case and the lower case are joined together such that there is an accommodating space therebetween, and the upper case and the lower case each have a substantially rectangular plate, and wall portions surrounding a periphery of the plate so as to define at least one portion of said space, and outer surfaces of the wall portions are inclined outwardly at a predetermined angle of inclination with respect to a direction perpendicular to the plate.

9. The recording tape cartridge of claim 8, wherein the end surface of the projection has an inclined surface running along the outer surface of at least one of the wall portions of the upper ease and the lower case.

10. The recording tape cartridge of claim 8, wherein the predetermined angle of inclination is from about 1° to about 2°.

11. The recording tape cartridge of claim 8, wherein the case is molded so as to have a draft at the peripheral wall, and the end surface of the projection has an inclined surface which runs along the draft of the peripheral wall at at least one portion of a wall surface at a periphery of the region where the end surface of the projection projects.

12. A recording tape cartridge which is loaded into a drive device for use, the recording tape cartridge comprising:
    a case for rotatably accommodating, at an interior of the case, a reel on which a recording tape is wound, the case having an opening for pulling-out of the recording tape from the interior of the case; and
    a shielding member, slidably held at the case, for closing the opening, wherein the case has a peripheral wall having an outer surface, and a projection is provided at the shielding member with the projection being exposed from the outer surface of the peripheral wall, such that, due to the cartridge moving in a predetermined direction for loading the cartridge into a drive device, the projection abuts one portion of the drive device and can be moved relative to the peripheral wall, whereby the shielding member opens the opening, wherein the projection, in a state in which the shielding member closes the opening, is within a region of a contour of the case, which region is demarcated by the outer surface of the peripheral wall, and wherein the case has an upper case and a lower case, and the upper case and the lower case are joined together such that there is an accommodating space therebetween, and the upper case and the lower case each have a substantially rectangular plate, and wall portions surrounding a periphery of the plate so as to define at least one portion of said space, and outer surfaces of the wall portions are inclined outwardly at a predetermined angle of inclination with respect to a direction perpendicular to the plate.

13. The recording tape cartridge of claim 12, wherein the projection has an end surface which runs along the predetermined direction for loading, and the end surface has a portion which is flush with at least one portion of the outer surface of the peripheral wall at a periphery of the projection.

14. The recording tape cartridge of claim 12, wherein the peripheral wall has a side wall and a front wall with respect to the predetermined direction for loading, and the opening is provided at a corner portion between the side wall and the front wall.

15. The recording tape cartridge of claim 14, wherein the corner portion has a surface which is inclined with respect to the predetermined direction for loading, and the opening is formed at said surface.

16. The recording tape cartridge of claim 12, wherein the end surface of the projection has an inclined surface running along the outer surface of at least one of the wall portions of the upper case and the lower case.

17. The recording tape cartridge of claim 12, wherein the predetermined angle of inclination is from about 1° to about 2°.

18. The recording tape cartridge of claim 12, wherein the case is molded so as to have a draft at the peripheral wall, and the end surface of the projection has an inclined surface which runs along the draft of the peripheral wall at at least one portion of a wall surface at a periphery of the region where the end surface of the projection projects.

* * * * *